United States Patent [19]

Zimmerman

[11] 3,893,913

[45] July 8, 1975

[54] METHOD OF REMOVING ORGANOMETALLIC COMPOUNDS FROM LIQUID HYDROCARBONS

[75] Inventor: Abraham A. Zimmerman, New Providence, N.J.

[73] Assignee: Exxon Research and Engineering Company, Linden, N.J.

[22] Filed: Apr. 8, 1974

[21] Appl. No.: 458,669

[52] U.S. Cl. ............... 208/253; 208/307; 208/296; 208/99
[51] Int. Cl. ............................................ C10g 17/00
[58] Field of Search.......... 308/253, 251 R, 252, 99, 308/289, 290, 295, 307, 278, 281, 91, 296

[56] References Cited
UNITED STATES PATENTS

| | | | |
|---|---|---|---|
| 1,769,794 | 7/1930 | Leamon............................. | 208/307 |
| 1,814,410 | 7/1931 | Richter et al...................... | 208/295 |
| 1,988,114 | 1/1935 | Egloff et al. ...................... | 208/287 |
| 2,392,846 | 1/1946 | Friedman........................... | 208/253 |
| 2,884,369 | 4/1959 | Mattox et al.................... | 208/251 R |
| 3,793,185 | 2/1974 | Whitehurst et al. .............. | 208/253 |

Primary Examiner—Delbert E. Gantz
Assistant Examiner—Juanita M. Nelson
Attorney, Agent, or Firm—Wayne Hoover

[57] ABSTRACT

Organometallic compounds are separated from liquid hydrocarbons containing the same by contacting the liquid hydrocarbon with an activated charcoal having cupric chloride impregnated thereon. The contacting may be accomplished at any combination of temperature and pressure at which the hydrocarbon will remain liquid and at which all components used in the process will remain stable. The contacting may be accomplished in essentially any suitable fashion; however, contacting in a fixed bed of the activated charcoal is, generally, most convenient and effective. Impregnation of the activated charcoal is accomplished by contacting a suitable activated charcoal with a solution of the cupric chloride and thereafter at least partially drying the resulting mixture such that the solvent remaining therein is internally adsorbed in the activated charcoal pores. Generally, the presence of water in the impregnated activated carbon adsorbent will improve separation performance. This method of separation is particularly suited to the separation of organo lead compounds from gasoline.

12 Claims, No Drawings

METHOD OF REMOVING ORGANOMETALLIC COMPOUNDS FROM LIQUID HYDROCARBONS

BACKGROUND OF THE INVENTION

This invention relates to a process for separating organometallic compounds from liquid hydrocarbons. More particularly, this invention relates to a process for separating organo lead compounds from liquid hydrocarbons.

As is well known, there is an increasing public and governmental interest in eliminating or at least significantly reducing the amount of lead emitted to the atmosphere as the result of combustion of leaded fuels in internal combustion engines. In fact, recently passed legislation does (or will) establish emission standards which can be met only through the use of substantially lead-free fuels. The same or related legislation also creates specifications for such fuels and may impose rather harsh sanctions against those which would market such fuels but not meet the specifications therefor.

The production of lead-free or substantially leadfree fuels is, of course, well within the ordinary skill of the art. Delivery of such fuels to the consumer, however, cannot be as easily accomplished. In fact, past experience with both lead-free and low lead fuels has indicated that intentional and/or inadvertent comingling of such fuels with leaded fuels renders such ultimate delivery impossible, at least, in 100% of the cases. Such comingling could, of course, occur in the pipelines or transport tankers as well as in storage tanks at terminals or retail outlets. The need, then, for a method, short of separate transport and storage facilities, which would ensure the delivery of a substantially lead-free fuel is readily apparent.

One such method which could be used is a separation method which would permit separation of relatively minor amounts of lead from the fuel stored at a terminal or a retail outlet (after transport) or from the gasoline in a tanker or pipeline or delivery truck prior to transfer into a storage vessel. Indeed, several separation processes have, heretofore, been proposed for the separation of organo lead compounds from gasoline. Generally, these have been two-step processes wherein the organo lead compound is first converted to an insoluble or more readily absorbed form and thereafter separated either by absorption, water washing, filtration and/or decanting. Often, the chemical conversion is accomplished with a Lewis acid such as stannic chloride, and in some cases the separation effected with an adsorbent such as activated charcoal. These prior art methods have, however, been primarily concerned with the separation of relatively high concentrations of lead (greater than 1 gram lead per gallon of gasoline) from relatively small volumes of gasoline and are not ideally suited to use for the separation of relatively small concentrations of lead (less than 0.5 grams lead per gallon of gasoline) from comparatively large volumes of gasoline. Moreover, these prior art processes often result in an undesirable increase in the gum content of the treated gasoline. As is also known from applicant's copending application Ser. No. 405,124, filed Oct. 10, 1973, certain activated charcoals which are impregnated with a hydrous ferric chloride can be used to separate organo lead compounds from gasoline and the aforementioned difficulties of the prior art processes avoided thereby. It has recently been discovered, however, that the adsorption or separation capacity of the ferric chloride impregnated carbons is significantly reduced with gasolines containing relatively large amounts of either light or heavy cat naphthas. The need, then, for a separation process geared to the treatment of large volumes of gasoline without increasing the gum content thereof and which can be effectively used with gasolines containing relatively large concentrations of light and/or heavy cat naphthas is, therefore, believed to be readily apparent.

SUMMARY OF THE INVENTION

It has now been found that the foregoing and other deficiencies of the prior art organo lead separation processes can be avoided with the process of this invention and a process well suited to the separation of relatively small concentrations of lead from relatively large volumes of liquid hydrocarbon provided thereby. It is, therefore, an object of this invention to provide an improved process for separating organo lead compounds from liquid hydrocarbons. It is another object of this invention to provide such a process wherein the separation is accomplished at a relatively high rate. It is still another object of this invention to provide such a process which may be used without increasing the gum content of the liquid hydrocarbons subjected to treatment. It is yet another object of this invention to provide such a process which can be used effectively with gasolines containing light and/or heavy cat naphthas. Still other objects and advantages will become apparent from the disclosure set forth hereinafter.

In accordance with the present invention, the foregoing and other objects and advantages are accomplished with a process wherein a liquid hydrocarbon containing one or more organo lead compounds is contacted with an activated charcoal having a cupric chloride impregnated thereon. As is pointed out more fully hereinafter, it is essential that the activated carbon be substantially amorphous.

DETAILED DESCRIPTION OF THE INVENTION

Broadly, the method of this invention can be used to separate or remove organo lead compounds from any hydrocarbon which might contain such organo lead compounds in a dissolved form. The process may, then, be used to separate organo lead compounds from normally gaseous hydrocarbons which have been made liquid as a result of increased pressure as well as solid or highly viscous hydrocarbons which had been made liquid as the result of increased temperature. The process is equally useful to separate organo lead compounds from mixtures of such hydrocarbons as well as mixtures of either one or both of these types of hydrocarbon with normally liquid hydrocarbons. The process is, however, most useful for the separation of organo lead compounds from mixtures of normally liquid hydrocarbons, which mixtures may contain one or more gaseous hydrocarbons dissolved therein. Mixtures of this type include the leaded and unleaded fuels such as gasoline, jet fuel and kerosene. The method of this invention is particularly useful for the separation of organo lead compounds from conventional leaded gasolines as well as unleaded gasolines which may as the result of contamination contain relatively minor amounts of organo lead compounds.

Surprisingly, it has been discovered that only a limited number of the commercially available activated carbons or charcoals can be used in the process of this invention to achieve the desired degree of separation. In this regard, it should be noted that activated carbons which are substantially amorphous; i.e., activated carbons which do not exhibit a graphitic structure or at least only slightly so, and which have high oxygen content, high pore volumes and relatively high surface area per unit weight are most effective. It should also be noted, that, in general, the method of preparing the activated carbon; i.e., preparation with or without chemicals, may not have any significant effact on the performance thereof in the process of this invention and activated carbons prepared by any method are considered equivalent so long as the properties thereof are within the ranges set forth hereinafter. One exception to this otherwise general rule is that preparation in the presence of a relatively strong acid such as hydrochloric acid or treatment with such an acid after preparation will, generally, enhance performance. Care should, however, be taken in such treatment to avoid acid concentrations sufficiently high to permit leaching thereof during the contacting process such that the acid number of the treated hydrocarbon is significantly increased.

As has been noted, supra, it is essential to the method of this invention that the activated carbons employed therein be substantially amorphous. This does not, however, mean that the activated carbons must be completely free of crystalline structure. In fact, it has been found that useful activated carbons may exhibit up to about 20 wt. % crystallinity or that the same may contain up to 20 wt. % of carbon having a graphitic type structure. Such activated carbons are, therefore, considered to be within the meaning of "substantially amorphous" as used herein. Also, the activated carbons which are useful in the method of this invention will exhibit oxygen contents within the range of about 3 to about 25 wt. %; total pore volumes within the range of about 0.5 to about 1.5 ml/g; and surface areas within the range of about 200 to about 1500 m$^2$/g.

At this point it should be noted that while any activated carbon exhibiting properties within the aforedescribed ranges is operable, best results are obtained with activated carbons containing minimal amounts; i.e. less than about 5 wt. %, of crystalline structure. Moreover, it should be noted that when activated carbons having higher degrees of crystalline structures (within the range heretofore specified) are used, best results therewith will probably be obtained when there is also a corresponding increase in the oxygen content thereof as well as with increased total pore volume.

As will be readily apparent, the particle size of the activated carbon is not critical to the present invention. Indeed, the method would be quite operative with any particle size provided that satisfactory means for separating the impregnated activated carbon are used. In this regard, it should be noted that essentially any of the filtration or centrifugation methods known in the prior art could be used to separate particles too small to be separated with any other means in either a batch or continuous operation. Similarly, any other means known to be effective in separating solids from liquids could be employed to effect the desired separation. It is, however, most expedient and effective to carry out the method of the present invention in such a way as to either eliminate or at least minimize the need for such solid separation and to minimize contacting time. For this reason, it is preferred to accomplish the liquid hydrocarbon-impregnated activated carbon contacting by passing the liquid hydrocarbon through a fixed bed of the impregnated, activated carbon. When this method is used, a granular type activated carbon will be used and the particle size will, generally, range between about 0.01 and 0.20 inches.

In general, any of the cupric chlorides, including both hydrous and anhydrous cupric chloride, may be used to impregnate the activated carbon used in the method of the present invention. As is well known, the hydrous cupric chlorides may be represented by the formula $CuCl_2 \cdot XH_2O$ wherein X is generally 2. These compounds may, of course, be readily prepared with methods well known in the prior art or the same may be obtained commercially from several sources.

The impregnated activated carbon used in the method of this invention will be prepared by first dissolving a cupric chloride in a suitable solvent and then combining the cupric chloride solution with a suitable activated carbon. The concentration of cupric chloride in the solution as well as the amount of such solution used in combination with the activated carbon is, of course, not critical to the invention and a satisfactory impregnated product can be obtained over a relatively broad range of such conditions. Best results, however, will be obtained when the total concentration of cupric chloride in solution is sufficient to provide the desired concentration of cupric chloride on the activated charcoal and when the total amount of solution employed is sufficient to insure good wetting of the activated charcoal, and hence, good distribution of the cupric chloride without providing a large excess of solvent which must later be removed. Generally, the cupric chloride solution and the activated charcoal will be contacted in such a manner as to insure good distribution of the cupric chloride over the activated charcoal. This can, of course, be readily accomplished with any of the well known mixing techniques. After the cupric chloride solution and the activated carbon have been contacted for a sufficient period of time, excess solvent will be removed by drying. Again, this can be accomplished with methods well known in the prior art such as by drying at an elevated temperature in an oven and-/or by contacting the impregnated activated carbon with an inert stripping gas such as nitrogen or air. It will, of course, be appreciated that the drying time and-/or conditions can be controlled such that the resulting impregnated activated carbon may contain any desired concentration of solvent within the pores thereof.

Broadly, any of the known solvents for both hydrous and anhydrous cupric chloride can be used in the preparation of the impregnated, activated carbons used in this invention. These include water and most, if not all, lower molecular weight alcohols, and any of these solvents may be used with either the hydrous or anhydrous cupric chloride. Generally, however, the alcohols, such as methyl alcohol, ethyl alcohol, isopropyl alcohol, ethylene glycol monomethyl ether and the like, will be used as an aqueous mixture.

Generally, a satisfactory cupric chloride-impregnated activated carbon can be prepared by first forming a solution of cupric chloride containing between about 5 and 15 wt. % cupric chloride (on a water-free basis) and thereafter contacting between about 1 and 2 milliliters of this solution per gram of activated carbon (on a water-free basis). This contacting can be accomplished at any temperature and pressure at which the cupric chloride remains in solution and at which the solution remains liquid. Generally, the contacting will be continued for a period of time sufficient to permit a complete wetting of the activated carbon. Following this contacting, the wetted activated carbon will be dried so as to remove at least 50 wt. % of the total solvent and/or water, including any water derived from hydrous cupric chloride as well as any that might be contained in the activated carbon, therefrom and most generally so as to remove between about 70 and 95 wt. % of such total organic solvent and/or water. Generally, the cupric chloride impregnated activated carbon which may be used in the method of this invention will contain between about 5 and 20 wt. % $CuCl_2$ (on a water-free basis), between about 50 and 93 wt. % activated carbon, on a water-free basis, between about 2 and 30 wt. % water and between about 0 and 10 wt. % organic solvent.

In the broadest embodiment of this invention, organo lead compounds will be separated from liquid hydrocarbons by first contacting a liquid hydrocarbon containing one or more organo lead compounds with a cupric chloride impregnated activated carbon and thereafter separating either the liquid hydrocarbon from the impregnated activated carbon or separating the impregnated activated carbon from the liquid hydrocarbon. The desired contacting may be accomplished either in a batch, semi-batch or continuous operation and as indicated, supra, essentially any impregnated activated carbon particle size may be used. Where the particle size is relatively small, however, it will be necessary to separate the impregnated activated carbon from the liquid hydrocarbon with a suitable method such as filtration or centrifugation. Where the particle size is somewhat larger, however, separation might be accomplished by settling followed by decanting or again with methods such as filtration and centrifugation. Where the particle size is sufficiently large and particularly in the range previously specified, it will be possible to effect the contacting in a fixed bed of the impregnated activated carbon, in which case the liquid hydrocarbon will, effectively, be separated from the impregnated activated carbon after the desired contacting has been accomplished.

Broadly, the method of this invention may be used to treat liquid hydrocarbons containing essentially any possible concentration of dissolved organo lead compounds as well as any type thereof. Generally, however, the method will be used to treat hydrocarbons containing less than 5 grams of dissolved lead per gallon and the same will be most effective for treating liquid hydrocarbons having less than 0.5 grams of dissolved tetraethyl lead per gallon. In this regard, it should be noted that the effective life of the cupric chloride impregnated activated carbon will depend upon the amount of lead actually separated therewith and as is pointed out more fully, hereinafter, the method of this invention will be most effective when the liquid hydrocarbon is pretreated with a selected pretreating agent. The advantages derived from such pretreatment are, of course, most significant at the higher lead concentrations.

In general, separation of the organo lead compounds will be accomplished at a satisfactory rate when sufficient cupric chloride impregnated activated carbon is used to provide between about 2 and 20 grams of cupric chloride, on a water-free basis, per gram of dissolved lead in the liquid hydrocarbon subjected to treatment. Moreover, the rate of absorption will remain satisfactory, at least in those cases where the hydrocarbon does not contain other components which might interfere with the lead separation, until the amount of lead absorbed by the impregnated activated charcoal is somewhere within the range of about 0.05 to about 0.5 grams of lead per gram of cupric chloride (on a water-free basis) contained in the original cupric chloride impregnated activated carbon. As will be readily apparent, then, in a batch operation separation can be effected by adding a fixed amount of the impregnated activated carbon to a fixed volume of liquid hydrocarbon, the amount added being determined by the amount of lead to be separated from the liquid hydrocarbon and the amount, if any, of other components which might also be absorbed or otherwise decrease the absorbent capacity. In a semi-batch or continuous operation, on the other hand, contacting with a fixed amount of impregnated activated carbon would be continued until the amount of lead absorbed is sufficient to markedly or substantially reduce the rate of absorption or until the concentration of lead in the treated hydrocarbon exceeds the desired concentrations.

It will, of course, be appreciated that good contacting between the absorbed lead and the impregnated activated charcoal is important to a complete or effective separation. Such contacting could, of course, be achieved by shaking, agitation or the like or the same might be achieved by passing the liquid hydrocarbon through a fixed bed of impregnated activated charcoal. In this regard, it should be noted that sufficient contacting will be accomplished when the liquid hydrocarbon is passed through a fixed bed of activated charcoal having a particle size within the range heretofore specified at a rate within the range of about 2 to about 10 gallons per hour per lb. of impregnated activated charcoal.

In general, the contacting between the lead containing liquid hydrocarbon and the cupric chloride impregnated activated carbon will be accomplished at a temperature between about 30 and 120°F. and a contacting time within the range of about 1 and about 5 minutes will be sufficient to effect the desired separation. The fact that the method of this invention can be operated at relatively low temperatures does, of course, offer a tremendous advantage since it is contemplated that the same might be used at retail outlets which would not offer convenient heating facilities. The process cannot, however, be operated at extremely low temperatures since the rate of reaction and rate of diffusion into the pores of the activated carbon would become too slow.

As indicated, supra, the method of this invention can be effectively used to separate relatively large lead concentrations from liquid hydrocarbons. Large concentrations will, however, significantly reduce the useful life of the impregnated activated carbon. This in turn would result in frequent replacement or regeneration of the impregnated activated carbon and present an economic disadvantage. For this reason, then, it is most desirable to combine the method of the present invention with a different or more conventional method of separating lead so that the life of the impregnated activated carbon can be prolonged. In this embodiment of the invention, different and/or more conventional methods of separating lead from liquid hydrocarbons will be used to reduce the tetraalkyl lead content to a concentration preferably below about 0.5 grams per gallon and most preferably below about 0.3 grams per gallon. The liquid hydrocarbon having a reduced tetraalkyl lead concentration would then be subjected to treatment with a cupric chloride impregnated activated carbon in the manner heretofore described.

With respect to pretreatment of the lead containing hydrocarbon, stannic chloride, ferric chloride (in ether) copper chloride (in a suitable solvent) and silicon tetrachloride have been found most effective for this purpose. In general, these compounds will be used in accordance with techniques known or obvious from the prior art and such use need not be set forth in detail herein. Nevertheless, it should be noted that any one of these compounds or a mixture of any one or more thereof will, generally, be combined with the liguid hydrocarbon containing dissolved lead at a temperature between about 30° and about 120°F. and contacted for a period of time sufficient to effect the desired conversion of the soluble lead compounds. The conversion products thus formed will then be separated with a suitable method such as absorption, water washing, decanting, filtration and/or centrifugation. It will, of course, be appreciated that the amount of pretreating agent actually employed is not critical, but this amount will, generally, exceed the stoichiometric amount required for conversion of the soluble lead compounds present in the treated hydrocarbons to monohalide derivatives.

While the use of a pretreatment in combination with the improved method of this invention, offers the greatest advantage of prolonging the life of the cupric chloride impregnated activated carbon when liquid hydrocarbons containing relatively high concentrations of lead are treated, it has surprisingly been discovered that such a pretreatment, even when treating liquid hydrocarbons containing relatively small concentrations of lead, significantly improves the separation performance of the method of this invention. In this regard, it has been found that a pretreatment with a halide selected from the group consisting of ferric chloride (in ether), stannic chloride, cupric chloride in isopropyl alcohol and silicon tetrachloride is particularly effective for this purpose. Again, the pretreatment may be accomplished in accordance with the techniques known or obvious from the prior art and substantially in the manner described in the preceding paragraph.

As indicated supra, the method of the present invention can be used to separate dissolved organo lead compounds from any liquid hydrocarbon. The process is particularly useful, however, for the separation of organo lead compounds such as tetraethyl lead and tetramethyl lead from mixtures of liquid hydrocarbons such as gasoline, jet fuel and kerosene and the same is most effective for separating tetraethyl lead. The method of this invention is particularly useful for the separation of minor concentrations of such lead compounds from liquid hydrocarbon mixtures to be offered and sold as unleaded gasolines.

PREFERRED EMBODIMENT

In a preferred embodiment of the present invention, an activated carbon impregnated with a solution of hydrous cupric chloride and containing between about 8 and 15 wt. % $CuCl_2$, 5 to 20 wt. % combined organic solvent and water, the organic solvent, when used, comprising no more than about 25 wt. % of the combined total, and 65 to 87 wt. % activated carbon will be used to separate tetraethyl lead and other tetraalkyl leads from gasolines intended to be sold and used as unleaded gasolines within the meaning of recent Federal legislation, i.e., gasolines containing no more than 0.05 g Pb/gal. In the preferred embodiment, a lower alcohol such as methyl alcohol, ethyl alcohol, isopropyl alcohol, etc. will be used as the solvent in combination with $H_2O$ at a volume ratio within the range of about 2:1 to about 10:1 alcohol to water on a weight basis and most preferably within the range of about 5:1 to about 8:1. The activated carbon used in the impregnated composition will be essentially free of graphitic type carbon (less than about 5 wt. %) and have a pore volume within the range of about 0.8 and 1.2 ml/g; an oxygen content within the range of about 10 and 20 wt. % and a surface area between 500 and 1000 $m^2/g$. The separation will be accomplished by contacting the lead containing gasoline with the cupric chloride impregnated activated carbon at a temperature between 40° and 85°F. such that the actual contacting time between the leaded fuel and the impregnated activated carbon will be between about 1 and 3 minutes.

In the preferred embodiment, the lead concentration in the gasoline will be less than 0.5 g./gallon and in a most preferred embodiment the lead concentration will be less than 0.3 g/gallon. Moreover, the lead containing gasoline will be pretreated by contacting the same with a coupound selected from the group consisting of ferric chloride (in ether), stannic chloride, copper chloride (in alcohol) and silicon tetrachloride and most preferably with copper chloride in isopropanol. The pretreatment will be accomplished by contacting the leaded gasoline with an amount of such compound ranging between about 1 and about 10 times that required for a stoichiometric conversion of the tetraalkyl lead contained therein to a monohalide derivative. The pretreatment will be accomplished at a temperature between about 40 and 85°F. under conditions of intimate contacting for a period of time between about 5 and 30 minutes. The pretreated gasoline will then be contacted with an activated carbon exhibiting properties within the range heretofore specified and thereafter contacted with the cupric chloride impregnated activated carbon. The contacting with the impregnated activated carbon will be accomplished in a fixed bed thereof, the activated carbon having an average particle size within the range of about 0.015 to about 0.10 inches and at a flow rate between about 3 and about 9 gal. (gasoline) per hour per pound of impregnated activated carbon.

It is believed that the present invention will become even more apparent from the following examples which illustrate the broadest embodiment thereof, a preferred embodiment thereof and a most preferred embodiment thereof. These examples also compare the results obtained by the method of this invention with both prior art methods and methods closely analogous to that of the present invention. These examples are not, however, intended to limit the invention in any way.

EXAMPLE 1

An activated carbon impregnated with hydrous cupric chloride was prepared by first dissolving 6.0 grams of $CuCl_2·2H_2O$ in 3.0 grams of water and 30.0 g. of methanol and then combining this solution with 50.0 grams of granular activated carbon containing 5 wt. % water. The particle size of the granular carbon was such that the same all passed through a 20 mesh (U.S.)

screen and was retained on a 40 mesh (U.S.) screen. The activated carbon had a total pore volume of 1.1 ml/g, contained 16.5% oxygen, had a surface area of 640 m²/g and was essentially amorphous or nongraphitic. The aqueous methanolic cupric chloride solution and the activated carbon were combined at a temperature of 75°F. and the combined mixture was stirred until the activated carbon was thoroughly wetted. The combined mixture was then dried with nitrogen gas at a temperature of 75°F. for a period of 2.5 hours. The resulting activated carbon contained 8 wt. % $CuCl_2$, 1.5 wt. % methanol, 8.5 wt. % $H_2O$ and 82% carbon. Ten grams of the impregnated activated carbon thus prepared were placed in a fixed bed and contacted with 4 liters of gasoline containing 0.09 grams Pb/gallon at 75°F., such that the average contact time was about 1 minute.

During the contacting, the flow of gasoline was sufficient as to assure the desired degree of contacting between the lead and the activated carbon. After completion of the contacting, the treated gasoline was filtered to separate any suspended solids remaining therein. The treated gasoline was then analyzed and found to contain 0.035 grams Pb/gallon.

As will be readily apparent, then approximately 78% of the dissolved lead was removed and the resulting product contained less than 0.05 grams Pb/gallon. The resulting product could, then, be sold as an unleaded gasoline within the meaning of recent Federal legislation.

EXAMPLE 2

Four liters of gasoline identical with that used in Example 1 was first contacted with 0.5 grams cupric chloride (2% solution in isopropanol), at a temperature of 75°F. for an average of 30 minutes in small batches. In this Example, the gasoline was initially stirred during this contacting period. Following this pretreatment the gasoline was filtered to separate suspended solids and passed through a bed comprising 10 grams of the hydrous cupric chloride impregnated activated carbon prepared in Example 1 at a temperature of 75°F. Again, the contacting was accomplished by passing the gasoline through a fixed bed of the activated carbon and the treated gasoline was filtered thereafter to separate any suspended solids remaining therein. Following this contacting, the treated gasoline was then analyzed for dissolved lead content. As a result of these tests, it was found that the same contained 0.015 grams Pb/gallon.

As will be apparent from the preceding example, improved results are obtained, even when the concentration of dissolved lead in the gasoline is relatively low, as a result of pretreatment with cupric chloride. Moreover, a pretreatment of this type can be used to convert marginal separations into acceptable separations and thereby increase the effectiveness of the method of this invention to produce a product having less than 0.05 grams Pb/gallon.

EXAMPLE 3

An activated carbon impregnated with an aqueous methanolic solution of hydrous cupric chloride was prepared in substantially the same manner as that set forth in Example 1 except that the relative concentrations and the drying time were modified to produce a product containing 9 wt. % $CuCl_2$, on a water-free basis, 10 wt. % water and 81% activated carbon. Ten grams of the impregnated activated carbon thus prepared were then used to treat 4 liters of a gasoline containing 0.10 g Pb/gallon in the same manner and at the same conditions as described in Example 1. The treated gasoline contained 0.02 g. Pb/gallon.

EXAMPLE 4

An activated carbon impregnated with an aqueous methanolic solution of hydrous cupric chloride was again prepared in substantially the same manner as indicated in Example 1 except that the ratio of starting materials and the drying time was modified so as to produce an impregnated activated carbon containing 9 wt. % $CuCl_2$, on a water-free basis, 20 wt. % water and 71% activated carbon. Ten grams of this material were then used to treat 4 liters of gasoline containing 0.10 g Pb/gallon in the same manner and at the same conditions as described in Example 1. The lead content of the treated gasoline was found to be 0.025 g. Pb/gallon.

EXAMPLE 5

An activated carbon impregnated with an aqueous methanolic solution of hydrous cupric chloride was prepared in sustantially the same manner as set forth in Example 1 except that the ratio of starting materials and drying times were again modified so as to produce an impregnated activated carbon containing 9 wt. % $CuCl_2$, on a water-free basis, 28 wt. % water and 63 wt. % activated carbon. Ten grams of this impregnated activated carbon were then used to treat four liters of gasoline containing 0.10 g Pb/gallon in the same manner and at the same conditions as described in Example 1. In this Example, however, the lead content was found to be 0.05 g Pb/gallon.

As will be apparent from a comparison of Examples 3–5, the method of the present invention is operative with impregnated activated carbons containing a relatively wide range of water concentrations. As will also be apparent, impregnated activated carbons having higher water content appear to be about equally effective in the separation of soluble lead compounds provided the water content does not exceed about 20 wt.%.

EXAMPLE 6

An activated carbon impregnated with hydrous cupric chloride was prepared by first dissolving 10.0 g. hydrous cupric chloride in 5.0 g. of water plus 35.0 g. of methyl alcohol and thereafter combining this solution with 50.0 g. of activated charcoal identical with that used in Example 1. The preparation was identical to that set forth in Example 1. The impregnated product thus obtained contained 13.0 wt. % $CuCl_2$, 9 wt. % water and 78 wt. % activated carbon. Ten grams of this impregnated activated carbon were then used to treat four liters of gasoline containing 25 wt. % of light and heavy cat naphtha and 0.10 g Pb/gallon in the same manner and at the same conditions as used in Example 1. Following the contacting, the gasoline was analyzed for lead content and the lead content found to be 0.015 g Pb/gallon.

EXAMPLE 7

An activated carbon impregnated with hydrous ferric chloride and comparable in concentration to the cupric chloride used in Example 6 was used to treat 4 l. of a gasoline containing 25 wt. % of light and heavy cat naphtha and 0.10 g. Pb/gal. at the same conditions as those used in Example 1. Following this treatment, the lead content of the gasoline was 0.065 g Pb/gal.

As will be readily apparent from a comparison of the results of Examples 6 and 7, the method of this invention is considerably more effective with gasolines containing light and heavy cat naphthas than the ferric chloride impregnated materials. As will also be apparent, a satisfactory "unleaded" gasoline can be prepared with any of these basic feedstocks.

EXAMPLE 8

An activated carbon impregnated with an aqueous methanolic cupric chloride solution was prepared by first dissolving 6.0 g. $CuCl_2·2H_2O$, in 6.0 g. of $H_2O$ and 30.0 g. of methyl alcohol and thereafter combining this solution with 50.4 g. activated carbon. The activated carbon contained 0.5 wt. % water, had a total pore volume of 0.8 ml/g, an oxygen content of 4.2 wt. % and a surface area of 1034 $m^2$/g. The activated carbon also exhibited a slight degree of crystallinity; i.e., it contained a small amount of graphitic type carbon. The preparation was done in a manner substantially identical to that set forth in Example 6 except that the drying was accomplished at 75°F. with nitrogen gas for a period of 5 hours. The resulting impregnated activated carbon contained 8 wt. % $CuCl_2$, 12 wt. % water and 80 wt. % activated carbon. Ten grams of this material were used to treat two liters of a gasoline containing 0.09 g. Pb/gallon in the same manner and at the same conditions as described in Example 1. Following the contacting, the treated gasoline was analyzed for lead content and the lead content was 0.02 g. Pb/gallon.

This particular activated carbon, while as effective as that used in Example 3, had a slightly excessive tendency to bleed copper compounds into the gasoline. The material is however, still considered useful in the method of this invention. Moreover, the adverse effects from copper build-up in the treated gasoline can be reduced through the use of an antioxidant such as N,N'disecondary butyl paraphenylene diamine and a metal deactivator such as N,N'disalicylal-1,2-diaminopropane.

EXAMPLE 9

An activated carbon was impregnated with a solution of hydrous cupric chloride by first combining 5.0 grams $CuCl_2·2H_2O$ in 26.0 g of methyl alcohol plus 5.0 g. of water and thereafter combining this solution with 32.1 g. of activated carbon. The activated carbon used in this example had a moisture content of about 5 wt. %, a total pore volume of about 1.3 ml/g, an oxygen content of about 5 wt. % and a surface area of about 1000 $m^2$/g. The activated carbon was also highly crystalline, i.e. it contained a high concentration of graphitic type carbon. Again, the preparation was substantially in the same manner as that used in Example 6 and the impregnated activated carbon thus obtained contained 10 wt. % $CuCl_2$, 12 wt. % water and 78 wt. % activated carbon. Ten grams of this material was then used to treat two liters of a gasoline containing 0.09 g. Pb/gallon in the same manner and at the same conditions as described in Example 1. Following the contacting, the treated gasoline was analyzed for lead content and the lead content was 0.07 g. Pb/gallon.

As will be readily apparent, this particular activated carbon removed only 22% of the initial lead concentration and the same is not, generally, considered operative within the scope of this invention. The reason for the ineffectiveness is believed to be a primary result of the highly crystalline structure.

EXAMPLE 10

An activated carbon impregnated with hydrous cupric chloride and identical to that prepared in Example 6 was used to treat a gasoline containing 0.10 g. of an equilibrated mixutre of tetraethyl and tetramethyl lead, rather than just tetraethyl lead as in all previous Examples at the same conditions as used in Example 1. Following this treatment, the lead content of the gasoline was 0.03 g Pb/gallons.

EXAMPLE 11

An activated carbon impregnated with hydrous cupric chloride and identical to that prepared in Example 6 was used to treat a gasoline containing 0.13 g. of an equilibrated mixture of tetraethyl and a tetramethyl lead, rather than just tetraethyl lead. Following this treatment the lead content of the gasoline was 0.04 g Pb/gallons.

As will be apparent from a comparison of the previous Examples, the method of this invention is almost as effective in separating equilibrated mixtures of tetraethyl and tetramethyl lead as it is in separating just tetraethyl lead. As is also apparent, a satisfactory "unleaded" gasoline can be prepared from a gasoline containing these various lead compounds.

EXAMPLE 12

An activated carbon impregnated with hydrous cupric chloride and comprising 12 wt. % $CuCl_2$, 10 wt. % water, 78 wt. % activated carbon and a trace of methanol was prepared in substantially the same manner as that set forth in Example 1, except that the relative concentrations of the various starting materials was varied so as to yield the indicated composition and the combined mixture was dried with air rather than nitrogen, and 10 g. thereof was then used to treat 4 l. of a gasoline containing 25 wt. % light and heavy naphtha and 0.17 g. Pb (as TEL)/gal. The methanol to water weight ratio used in the sorbent preparation was 7:1. The lead content of the treated gasoline 0.03 g. Pb/gallon.

EXAMPLE 13

Ten grams of a sorbent identical to that used in Example 12 was used to treat 4 l. of a gasoline, containing 0.19 g. Pb (as TEL)/gal. but free of both light and heavy naphthas, in the same manner as used in Example 1 and identical to that used in Example 12. The lead content of the thus treated gasoline was 0.03.

As will be apparent from a comparison of Examples 12 and 13, the method of the present invention is effective for separating TEL from gasoline not containing light or heavy cat naphthas as well as those containing such naphthas. Moreover, the results obtained with both types of gasoline are nearly equivalent, though they are somewhat better with gasolines not containing such naphthas.

EXAMPLE 14

An activated carbon impregnated with hydrous cupric chloride and comprising 9.5 wt. % $CuCl_2$, 11.5 wt. % water, 79 wt. % carbon and a trace of methanol was prepared in substantially the same manner as described in Example 1 except that the relative concentrations of starting materials was changed so as to yield the indicated composition. More specifically, 7.3 g. $CuCl_2·2H_2O$ were dissolved in 7.0 g. water and 35.5 g. methanol and then combined with 50 g. activated carbon identical to that used in Example 1. Ten grams of this sorbent was then used to treat 4 l. of gasoline (identical to that of Example 1) in the same manner as that described in Example 1. The treated gasoline contained 0.02 g. Pb/gallon.

EXAMPLE 15

An activated carbon impregnated with hydrous cupric chloride was prepared by first dissolving 6.0 g. $CuCl_2·2H_2O$ in 49 g. $H_2O$ and was identical to that used in Example 1. The resulting mixture was then oven dried at 60°C. for 40 hours so as to yield a sorbent comprising 9 wt. % $CuCl_2$, 14% $H_2O$ and 77% carbon. Ten grams of this sorbent were then used to treat 4 l. of gasoline containing 0.18 g. Pb (as TEL)/gal. in the same manner as used in Example 1. The treated gasoline contained 0.03 g. Pb/gal.

EXAMPLE 16

An activated carbon impregnated with hydrous cupric chloride was prepared by first dissolving 5.2 g. $CuCl_2·2H_2O$ in 40 g. methanol and then combining this solution with 42.4 g. carbon which was identical to that used in Example 1. The resulting mixture was then dried with nitrogen at 75°F. for 6 hours so as to yield a sorbent comprising 10 wt. % $CuCl_2$, 7 wt. % methanol, and 83% carbon and a trace of water. Ten grams of this sorbent were then used to treat 4 l. of gasoline containing 0.10 g. Pb (as TEL)/gal. in the same manner as used in Example 1. The treated gasoline contained only 0.02 g. Pb/gallon but it also contained a significant amount of copper. The reason for the excessive copper presence is difficult to ascertain, but it is known that copper is not appreciably leached from the sorbent when the same comprises water. As a result of this and other data, it has been concluded that the presence of water is essential to minimizing copper leaching, at least with certain gasolines and particularly those containing light and/or heavy cat naphthas.

While the present invention has been described and illustrated by reference to particularly preferred embodiments thereof, it will be appreciated that the same lends itself to several variations which would be ovbious to those of ordinary skill in the art. Reference should, therefore, be made solely to the appended claims to determine the scope of the present invention.

Having thus described and illustrated the present invention what is claimed is:

1. A method for separating an organo lead compound from liquid hydrocarbons comprising the steps of contacting a liquid hydrocarbon containing an organo lead compound dissolved therein with a substantially amorphous activated carbon impregnated with cupric chloride and recovering a liquid hydrocarbon having a reduced dissolved lead content therein.

2. The method of claim 1 wherein the activated carbon is impregnated with a solution of hydrous cupric chloride and the same comprises between about 5 and about 20 wt. % $CuCl_2$, between about 0 and about 10 wt. % lower molecular weight alcohol, between about 2 and 30 wt. % water, and between about 50 and about 93 wt. % activated carbon.

3. The method of claim 2 wherein the activated carbon has an oxygen content within the range of about 3 to about 25 wt. %.

4. The method of claim 2 wherein the impregnated activated carbon comprises between about 8 and about 15 wt. % $CuCl_2$, between about 0 and about 5 wt. % lower molecular weight alcohol, between about 5 and 20 wt. % water, and between about 65 and about 87 wt. % activated carbon.

5. The method of claim 4 wherein said activated carbon contains less than about 5 wt. % carbon having a crystalline structure; has an oxygen content within the range of about 10 to about 20 wt. %; has a total pore volume within the range of about 0.8 to about 1.2 ml/g; and exhibits a surface area within the range of about 500 to about 1000 $m^2/g$.

6. The method of claim 2 wherein the contacting is accomplished at a temperature between about 30° and about 120°F.

7. The method of claim 6 wherein the contacting is accomplished in a fixed bed and continued for a period of time between about 1 and about 5 minutes.

8. The method of claim 7 wherein the liquid hydrocarbon contains less than about 0.5 g. Pb/gallon.

9. The method of claim 2 wherein said organo lead compound is a tetraalkyl lead compound.

10. The method of claim 9 wherein the liquid hydrocarbon contains less than about 0.5 g. Pb/gallon.

11. The method of claim 9 wherein the liquid hydrocarbon contains less than about 0.3 g. Pb/gallon.

12. The method of claim 7 wherein the liquid hydrocarbon contains less than about 0.3 g. Pb/gallon.

* * * * *